United States Patent [19]

Rosenberg

[11] Patent Number: 5,011,412
[45] Date of Patent: Apr. 30, 1991

[54] EDUCATIONAL KEYBOARD WITH REMOVABLE KEYS

[76] Inventor: Toni J. Rosenberg, 379 Harvard St., Cambridge, Mass. 02138

[21] Appl. No.: 556,025

[22] Filed: Jul. 20, 1990

[51] Int. Cl.5 .................. G09B 15/04; G09B 15/08; G09B 15/00
[52] U.S. Cl. .................. 434/227; 434/228; 434/340; 84/470 R; 84/478
[58] Field of Search .......... 84/467, 470 R, 477 R, 84/478, 479 A, 644, 670, 719, 744, DIG. 7, 16, 17, 20–22, 25; 434/227, 228, 230–232, 338–340, 343; 273/237, 238

[56] References Cited

U.S. PATENT DOCUMENTS 1,811,865  6/1931  Rogers ........................ 84/479 A
4,418,605 12/1983  Tollefsen et al. ............ 84/DIG. 7

FOREIGN PATENT DOCUMENTS 9051 of 1906 United Kingdom ............... 84/470

Primary Examiner—Richard J. Apley
Assistant Examiner—Karen G. Horowitz
Attorney, Agent, or Firm—Choate, Hall & Stewart

[57] ABSTRACT

An educational keyboard with removable keys, wherein musical tone generation for a given key is in response to correct placement of the key in its corresponding key slot, is disclosed. Incorrect placement results in a sour tone. Lights are also used to indicate correct and incorrect placement of keys. A computer interface for the keyboard allows a student to use pre-programmed interactive lessons tailored to the student's age and ability. Methods of teaching music theory and harmony with the keyboard utilize the student's left brain and right brain capabilities.

16 Claims, 2 Drawing Sheets

EDUCATIONAL KEYBOARD WITH REMOVABLE KEYS

BACKGROUND OF THE INVENTION

Many music students who study privately but never go to music school or take academic music courses learn very little harmony or theory. As a result, these students are lacking in the intellectual framework on which piano and other musical pieces are built. This can seriously compromise confidence and enjoyment in playing. Further, students who do go to music school tend to regard the learning of theory and harmony too much as a task and too little as a pleasure, and thus tend not to feel especially motivated to pass on their learning to others, whether in a professional sense or among their own family and friends. The realms of theory and harmony, and thus, to a certain degree, the realm of music itself, remain esoteric and for an elite few to intellectually comprehend.

The reasons for this limitation are varied, having partly to do with the place and view of art in our culture. Part of the reason, however, has to do with the dry, uncreative, and often intimidating way in which music theory and harmony are taught. Specifically, traditional methods of teaching harmony and theory rely on perceptions of logic and analytical thought (comprising names of notes, written musical theory, rhythmic notation, sequence of scales, structural details of the piece, etc.) rather than employing a combination of this type of thought and its complement: kinesthetic and spatial experience of the notes. The more the musical learning integrates these two kinds of thought (referred to also as left brain and right brain capacities), the quicker the learning takes place and the longer it is retained.

The present invention grew out of a desire to create a new approach to the study of musical theory and harmony for beginning students, students with some technique but no intellectual background, and students who are more advanced but whose training has relied on only part of their brain's learning faculties for music—in other words, a desire and need were felt for an approach that would be nonintimidating as well as more effective and more enjoyable than the traditional approach, and that could either be self-taught or learned through a combination of self-teaching and interacting with a teacher. The result is an accessible and inexpensive method of learning theory and harmony which can be enjoyed by keyboard and nonkeyboard music students alike, whether they are in elementary school or no longer in school, and whether they attend music school or have neither the time nor the money to do so.

SUMMARY OF THE INVENTION

The invention consists of a keyboard of several octaves with detachable keys. "The Keys to Music," the name of this educational keyboard, turns the tediousness of traditional theory and harmony learning into fun. A series of exercises, through the vehicles of a cartoon book, an audiocassette tape, and computer software, takes the student from basic to advanced concepts in theory and harmony which the student absorbs by removing, examining, and replacing various groups of keys on the keyboard. An analogous product in principle is the game Lego, in which the child is empowered to "engineer" the construction of buildings and building block units.

"The Keys to Music" uses musical tones and colored lights to indicate the correct placement of keys on the keyboard. The student literally "gets a grip" on the keys and gains a new sense of control over them by being able to "construct" a keyboard, and thus any particular grouping of keys, at will and by being able to isolate and focus on any grouping at will. Once a grouping has been removed, it—or a series of groupings—can be studied by placing the grouping on a surface away from the keyboard as well as on the keyboard itself.

"The Keys to Music" permits the student to visually and physically isolate any note or group(s) of notes he or she wishes to study—the notes in any particular scale(s), chord(s), arpeggio(s), etc.—and to control which notes are on the keyboard at any given time. The present invention thereby eliminates the otherwise inescapable visual sea of white and black that confronts students of the keyboard.

"The Keys to Music" is designed to:

Draw students more toward the study of music theory and harmony through the intrigue of a keyboard that places students in the role of creator and "engineer" rather than just reactor.

Make learning theory and harmony enjoyable and easier.

Provide an empowering, new way for the student to relate to the keys both physically and psychologically.

Increase music learing and memorization capacity by providing an integrated "whole-brain" (right-brain-and-left-brain) means of relating to the keys and to key patterns and interrelationships.

Deepen hand-eye-ear correlation for the keyboard student.

Put the student in control of the keys instead of the other way around.

Provide incentives for learning theory by including electronic, visual, audio, and software components that are amusing and challenging.

Overcome the sense of intimidation felt by most beginning piano students and by more advanced students who have studied little or no theory.

Increase the student's confidence in playing and performing by providing a familiarity and intimacy with the keys which are unavailable on standard keyboards.

Provide an opportunity for a parent, friend, sibling, etc., to join in the learning and teaching apart from the teacher.

DESCRIPTION OF THE PREFERRED EMBODIMENT

Figure 1:
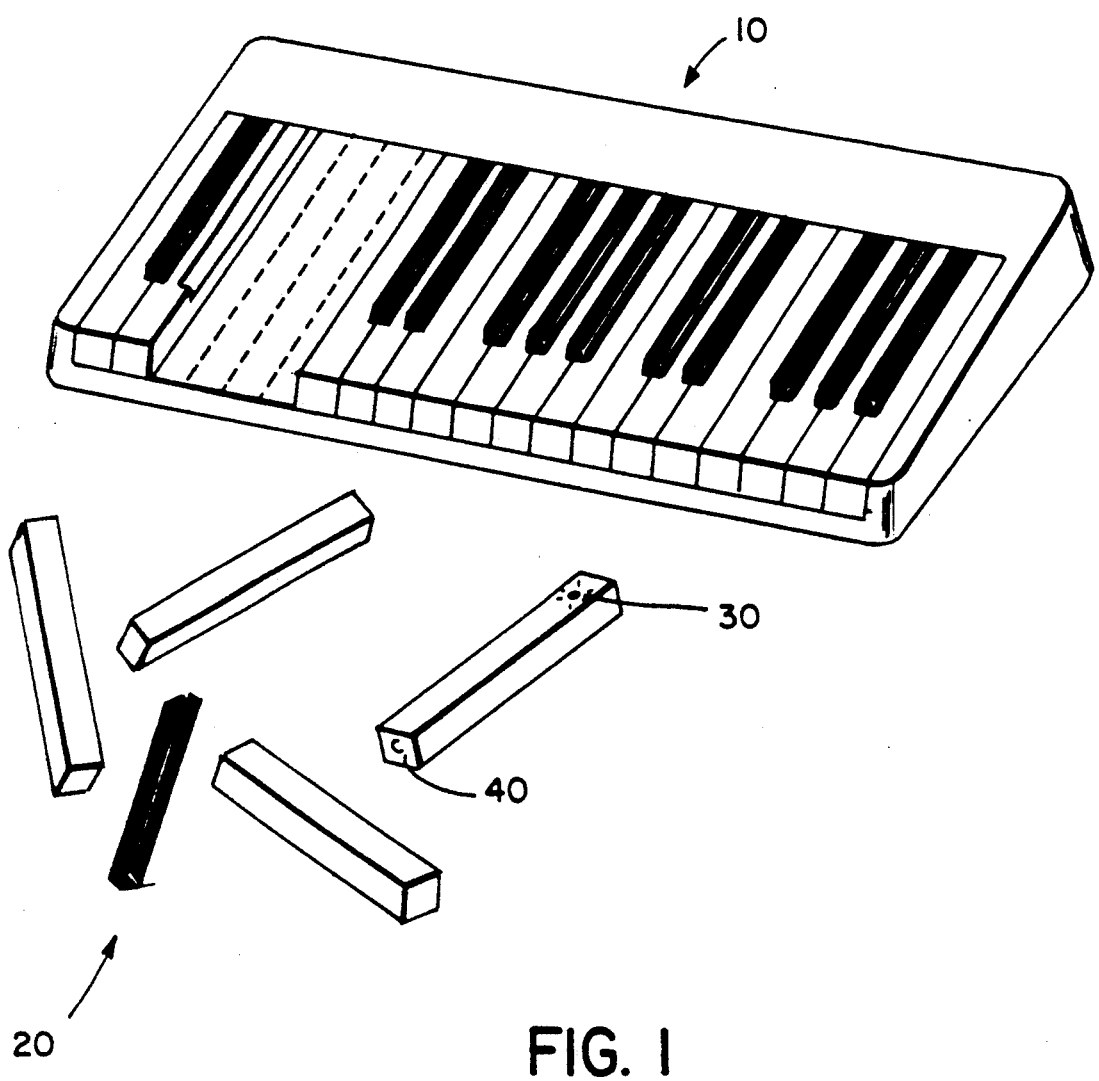
FIG. 1 illustrates schematically the educational keyboard of the present invention.

The educational keyboard of the present invention is illustrated schematically in FIG. 1. As shown, a keyboard 10 with removable keys 20 forms the heart of the invention. When a key is correctly placed on the keyboard, a musical tone corresponding to the key's note sounds. A variety of methods can be used to achieve this result. In preferred embodiments, the means is electronic or mechanical. In an example embodiment employing electronic means, a musical tone is sounded when a circuit is closed. Each key closes a different circuit connected to a tone generator which produces a frequency corresponding to the key's note. Such a circuit can comprise a pair of small electrodes installed in the keyboard base which become electrically connected when a key with a small metal wire bridge in its base comes in contact with the electrodes. In order that only the correct key produces the tone when placed on the keyboard, each key position and key can have their electrodes and wires in a different position along the length of the key, so that only correct key placement closes the circuit. A variety of other methods for tone generation corresponding to correct key placement can be easily implemented.

In preferred embodiments, colored lights go on when a key is correctly inserted, in addition to the sounding of the appropriate tone. The lights can be located either on the keys themselves, as shown as 30 on one key in FIG. 1, or on the keyboard just behind the keys. This feature can be easily implemented electronically if the light corresponding to each key is in the circuit closed by the placement of the correct key.

Also, in preferred embodiments, each key is letter-coded on the front vertical side, where the letter is visible but not obvious. The letter code 40 is shown on one key in FIG. 1. In a particularly preferred embodiment, the color of the letter code for each key matches the color of the light that goes on when a key is correctly placed on the keyboard.

In preferred embodiments, if a key is placed incorrectly, a red light goes on along with a "sour" tone indicating the error. One way to implement this feature electronically is to have a second circuit for each key which is closed by any key placement (electrodes and wire bridge at the same location on all key slots and keys). The red light and the tone generator for the sour note form part of the circuit. In this way, placement of any key closes the circuit. Additional circuitry is included to open this circuit if the first circuitry is closed by correct placement of the keys. In this simple way, correct key placement leads to a colored light and a musical tone corresponding to the key's note, and incorrect placement always leads to a sour tone and a red light.

The electronic implementation discussed above is just one of a variety of ways in which the keyboard with removable keys can be implemented. Other embodiments are within the scope of the present invention.

A variety of methods can be used to instruct the student using the keyboard. The simplest method for the young beginner is to have a teacher, parent, or friend instruct the student directly, but older and more advanced students can use the keyboard and teaching tools alone or with someone else. Tasks can be assigned and games can be played according to the student's age and level of ability. Preferably, the keyboard includes an entire set of different-colored keys for a parent, teacher, or friend to use interactively as part of the learning process; the different colors (beige/brown instead of white/black, for example) ensure that the student's keys are clearly differentiated from the teacher's. Separate instructions for the teacher/parent with respect to using the beige/brown keys interactively are preferred to promote learning. In addition, the keyboard preferably includes at least one extra octave of keys to replace lost keys, and additional lost keys may be sent away for.

A wide variety of exercises which employ the student's right and left brain capabilities can be used to teach a student music theory and harmony with the keyboard of the present invention. For example, the student may start by removing all the keys from the keyboard, then placing back, one by one, all the notes in one scale on the keyboard, then all the notes in another scale, and so on, each time removing only those notes that are not in the next scale and adding the notes that are.

Another example exercise begins with the removal of all the keys, both black and white, from the keyboard. Then the student is requested to correctly place back on the keyboard only the black keys that are in groups of three. Next, the student is requested to correctly place on the keyboard the groups of four white keys that surround the sets of triple black keys. Then the student is asked to remove the four white keys and place them on the keyboard this time in pairs, F/G and A/B. The student is asked questions such as: Which black keys are the F and G adjacent to? Which black keys are the A and B adjacent to?

A third example exercise requires the student to place on the keyboard the keys that correspond to six consecutive minor thirds starting at middle C. The student can be asked to what possible scales this set can belong. Etc.

In one embodiment, the student is instructed with a book, preferably a cartoon book. In addition to showing the student tasks and games, the cartoon book can include interesting facts about music and musicians of all ages and times and provides easily comprehended information about how tones are generated by a keyboard and what the insides of both traditional and electronic keyboards look like.

The student can also be instructed with an audiocassette tape which steps a student through lessons. If a student is having difficulty, the tape can be rewound to repeat lessons or portions of lessons.

Figure 2:
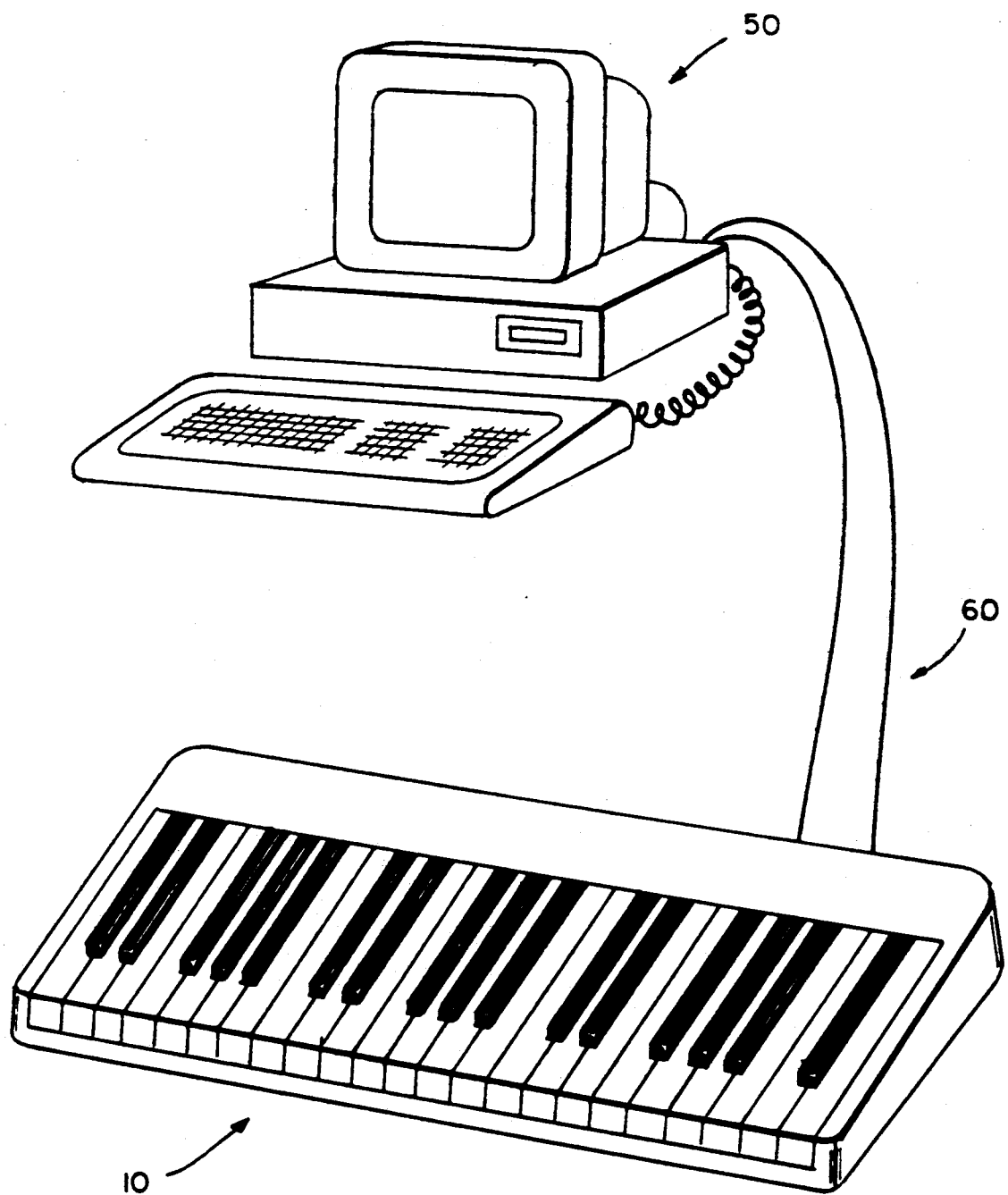
FIG. 2 illustrates a preferred embodiment of the present invention wherein the educational keyboard is interfaced to a computer.

In a preferred embodiment, the keyboard comprises means for a computer interface. This embodiment is illustrated in FIG. 2. As shown, the keyboard 10 with removable keys 20 is connected to a computer 50 via an interface 60 in such a way that the computer accepts as input signals from the keyboard, the signals being in response to the playing of the keys. In particular embodiments, the computer may also send signals to the keyboard to generate tones or turn on or off lights.

One way to achieve the computer interface employs a Musical Instrument Digital Interface (MIDI), a standard communication protocol familiar to those skilled in the art. This can be used to send data to the computer which include timing information for key press and release, and additional parameters such as key velocity and key pressure. In simple embodiments of the present invention, the full capabilities of such an interface are not used, and a simple databus connecting the keyboard to the computer, which simply indicates which keys are on or off, is sufficient. In one embodiment, this databus is an RS232 interface.

Programs running in the computer use text, graphics, or tones to lead students through lessons. The student's responses are monitored by the program. A correct response by the student can be rewarded with a graphics display (a cartoon, for example) or a tune. An incorrect response can be followed by a prompt to try again. The computer can be programmed to provide clues, if required. As the computer monitors a student's progress, it can increase or decrease the difficulty of the lessons in relation to the student's performance. Thus, a true interaction with the student is created, which helps keep the student's interest by involving him or her in tasks and games at the student's level of ability. If a student is responding quickly and making few mistakes, the program can quickly increase the level of the lessons. On the other hand, if the student is having a great deal of difficulty responding to the prompts of the computer, the level of the lessons can be quickly decreased to avoid discouraging the student. The computer software also allows for playing predesignated pieces as well as helping the student to compose them on the spot.

What is claimed is:

1. An educational musical keyboard and a corresponding set of musical keys substantially in the shape of standard musical keys including means borne on the keyboard and the keys cooperating to make musical tone generation of a given note possible only when the key corresponding to said note is inserted in its correct corresponding key slot on said keyboard.

2. The keyboard of claim 1 further comprising means for generation of a sour tone if a key is inserted in an incorrect key slot.

3. The keyboard of claim 1 further comprising lights corresponding to each key, each said light coming on only when its corresponding key is correctly inserted in its correct corresponding key slot.

4. The keyboard of claim 3 wherein each said light is a different color.

5. The keyboard of claim 3 wherein each said light is located on its corresponding key.

6. The keyboard of claim 4 further comprising a letter code on each key denoting the note of each key wherein said letter code for each given key is in the same color as said light for said given key.

7. The keyboard of claim 1 further comprising a letter code on each key denoting the note of each key.

8. The keyboard of claim 7 wherein each said letter code is a different color.

9. The keyboard of claim 1 wherein the means is electronic for making musical tone generation of a given note possible only when the key corresponding to said note is inserted in its correct corresponding key slot.

10. The keyboard of claim 1 further including means for an interface to a computer, whereby said computer accepts as input signals from said keyboard, said signals being responsive to the playing of keys on the keyboard.

11. The keyboard of claim 10 wherein said interface comprises a databus.

12. The keyboard of claim 10 wherein said interface comprises a MIDI.

13. The keyboard of claim 10 wherein said databus comprises an RS232 interface.

14. A method for teaching music theory and harmony to a student comprising: providing a musical keyboard and a corresponding set of musical keys substantially in the shape of standard musical keys wherein musical tone generation of a given note is possible only when the key corresponding to said note is inserted in its correct corresponding key slot on said keyboard, and providing means for and thereafter instructing the student to perform exercises involving removing and/or replacing keys in their correct slots on said keyboard, said exercises designed to teach music theory and harmony.

15. The method of claim 14 further comprising providing extra complete set of keys in a color different from those of the keyboard, whereby a teacher can use the extra set of keys for demonstration purposes.

16. The method of claim 14 wherein said instructing is by means of printed instructions provided to the student and/or a teacher.

* * * * *

UNITED STATES PATENT AND TRADEMARK OFFICE
CERTIFICATE OF CORRECTION

PATENT NO. : 5,011,412
DATED : April 30, 1991
INVENTOR(S) : Toni J. Rosenberg

It is certified that error appears in the above-identified patent and that said Letters Patent is hereby corrected as shown below:

Column 6, line 33, before "extra" insert -- an --.

Signed and Sealed this

Twenty-seventh Day of October, 1992

Attest:

DOUGLAS B. COMER

*Attesting Officer*     *Acting Commissioner of Patents and Trademarks*